Dec. 3, 1946.　　　K. L. SMITH　　　2,412,181
INSECT EXTERMINATOR
Filed Jan. 24, 1945　　　3 Sheets-Sheet 1
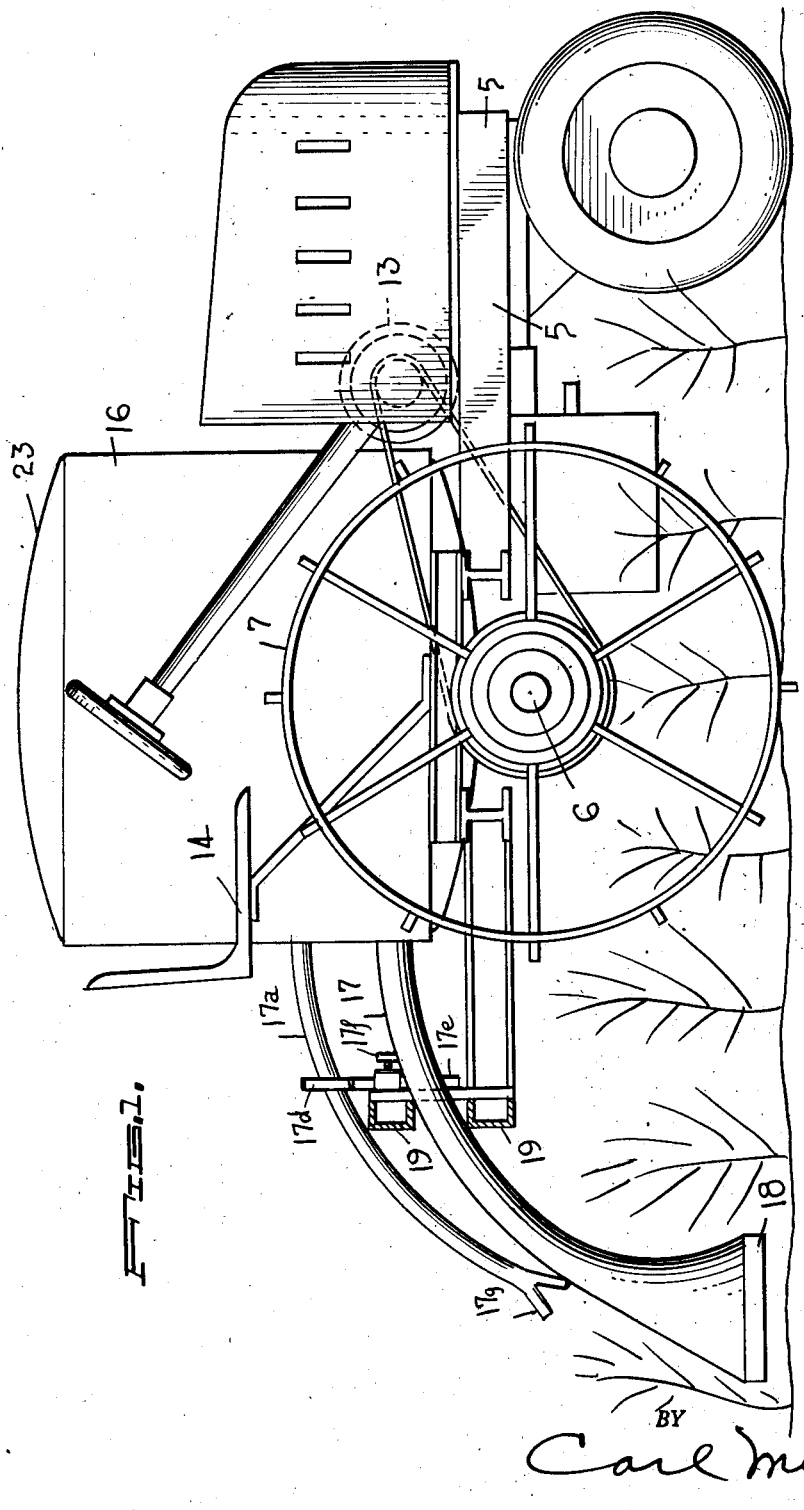
INVENTOR.
KENNA L. SMITH.
BY Carl Miller
ATTORNEY.

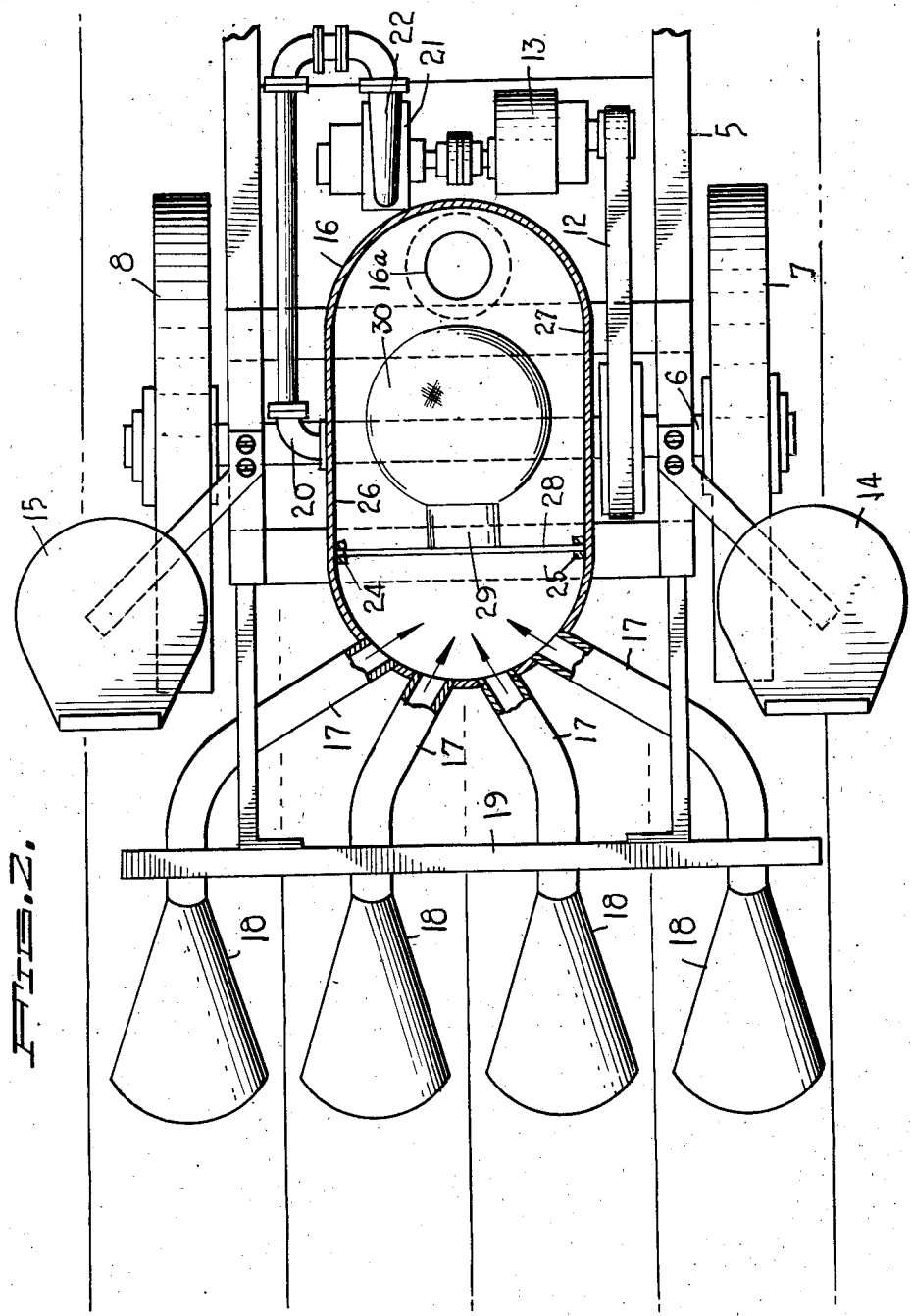

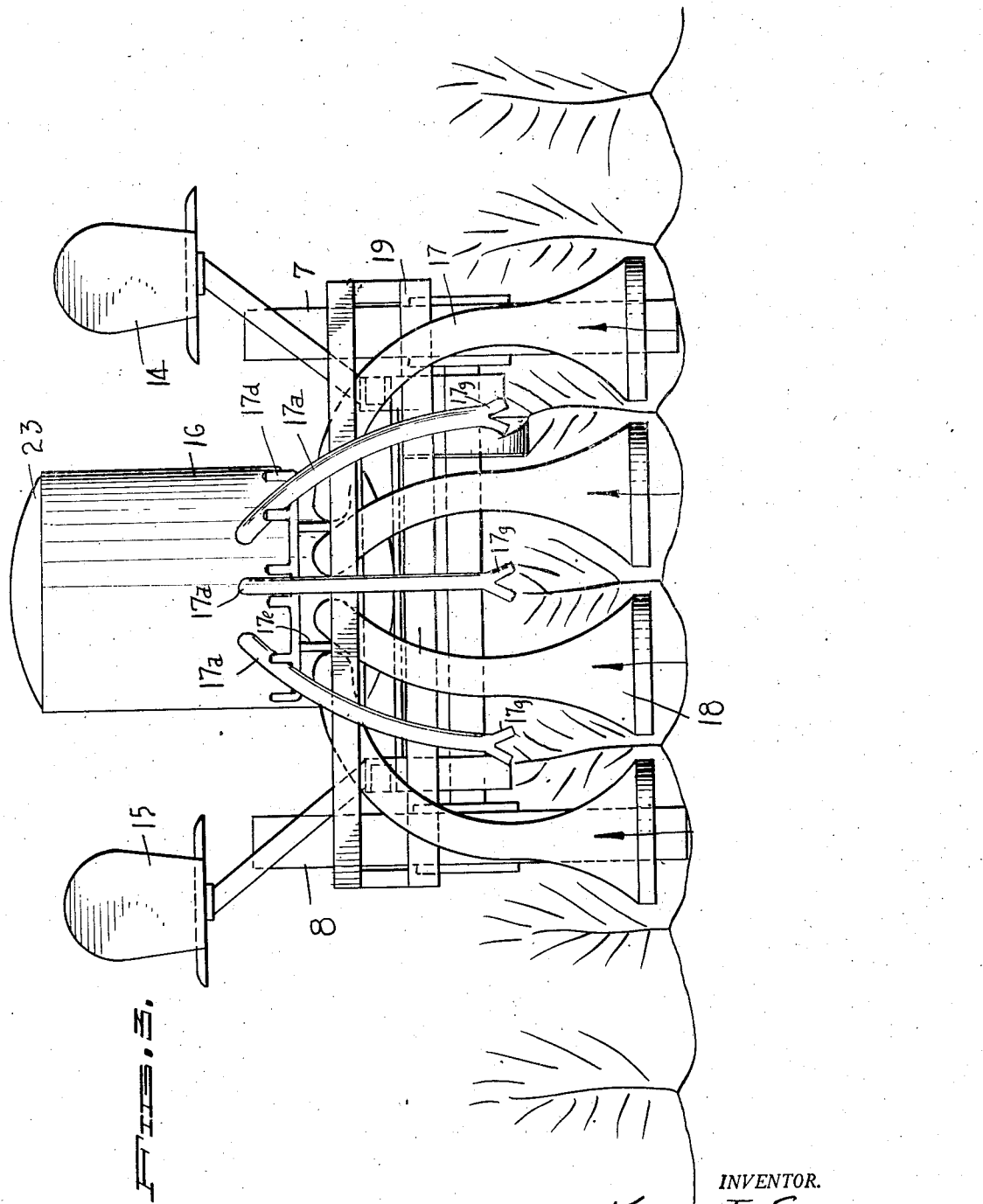

Patented Dec. 3, 1946

2,412,181

UNITED STATES PATENT OFFICE 2,412,181

INSECT EXTERMINATOR

Kenna L. Smith, Pascagoula, Miss.

Application January 24, 1945, Serial No. 574,293

1 Claim. (Cl. 43—140)

This invention relates to an improved device for collecting and exterminating insects which attack growing crops, and one of its objects is to combine with a motor driven vehicle, a plurality of suction nozzles supported to pass over the ground close to growing crops, a receiving tank in which low air pressure is maintained, and means operating by the power plant of the vehicle for maintaining suction in the tank, whereby insects will be collected in the tank and exterminated.

Another object of the invention is to provide a collecting device, which may be removed from the tank, which will serve to hold insects sucked into the tank, and which will therefore protect the suction blower from the interference which the circulation of the insects would cause.

With the above and other objects in view the invention consists in certain new and useful constructions, combinations, and arrangements of parts, clearly described in the following specification, and fully illustrated in the accompanying drawings, in which:

Fig. 1 is a side elevation.

Fig. 2 is a top plan view, partly in horizontal section.

Fig. 3 is a front elevation.

Referring to the accompanying drawings illustrating the practical embodiment of the invention 5 designates a vehicle frame having a main or rear axle 6, on the ends of which the traction wheels 7 and 8 are mounted to turn with the axle. A front axle 9 is also provided which carries on its ends the rubber tired wheels 10 and 11.

The main axle 6 is driven by means of the chain or belt, or other form of drive, indicated at 12, from the power plant 13. A steering post and the usual steering means are provided for directing the movement of the vehicle over the field. Seats 14 and 15 are provided on the sides of the vehicle.

Between the main traction wheels 7 and 8 a receiving tank 16 is arranged. From the rear side of this tank a series of suction conduits 17 extend rearwardly, and each suction conduit is provided on its lower end with an intake conical nozzle 18. The conduits 17 are constructed of flexible material, so that they may be directed to various ground positions, and may be raised and lowered, between the cross bars 18 and 19, of the vehicle frame 5.

A suction conduit 20 is connected with the tank at one side thereof, and the forward end of this suction conduit communicates with the housing 21 of the suction blower 22, which is driven by the motor plant 13. The tank is provided with a removable cover 23.

Within the tank 16, which has an outlet 16a, vertical guides 24 and 25 are arranged against the opposite sides of the walls 26 and 27 of the tank, and a vertical partition 28 is arranged to slide on these guides. This partition may consist of a frame and a screen, and is equipped with a lateral nipple 29, on which the porous insect collecting bag 30 is fitted, and this serves to trap the insects and forms a container for their removal from the tank. The bag also serves as a filter and prevents the insects from entering the blower.

A condition of low air pressure is maintained in the tank 16 by the suction produced through the conduit 20, which maintains the bag normally inflated while suction is maintained in the tank 16. The low air pressure in the tank causes the normal air to press into the bag, so that the bag is maintained inflated by this difference of air pressure.

By removing the cover 23 and withdrawing the partition 28, the collecting bag may also be withdrawn. If desired an insect exterminating agent, gas, powder or liquid, may be introduced into the tank, so as to exterminate all insects and their eggs, collected in the bag.

In addition to the flexible conduits 17, flexible conduits 17a are provided, which are connected to the tank 16, and these conduits 17a are adjusted vertically by means of the guide bar 17d, which is adjusted by its vertical rods 17e and the screws 17f. The lower ends of the conduits 17a are divided to provide a plurality of nozzles or suction intakes 17g, and are supported near the tops of the growing crops. All of these flexible conduits 17a may be supported as to cover a greater or smaller field area. As the crops grow the flexible conduits may be raised, so that their nozzles will be over the tops of the crops, or in a favorable intermediate position, as the tractor is drawn or driven over the field.

The force of the suction may be controlled by the speed under which the engine is operated. By increasing the engine speed the suction would be increased, and by decreasing the engine speed the suction would have less force. A transmission reduction gearing (not shown) may be used between the engine and suction blower for this purpose.

It is seen that by my invention the greater part of all insects and worms which infest field crops, may be collected quickly, without injury to the crops, and trapped so as to permit of safe and economical extermination of the insects and their eggs.

It is understood that various changes in the details of construction, combination and arrangement of parts, may be made, within the scope of the invention as defined in the claim hereof.

Having described my invention I claim as new:

A field insect exterminating device, consisting of a vehicle having a motor plant for driving the same, a receiving tank on the vehicle, a suction blower on the vehicle, driving connections between the blower and the motor plant, means establishing suction communication between the blower and the tank, guides arranged in the tank, a partition slidable on said guides and provided with a lateral nipple, a filtering and collecting bag coupled to said nipple, and a suction nozzle communicating with the tank and adapted to be positioned close to the ground over which the vehicle travels.

KENNA L. SMITH.